United States Patent
Hakiri et al.

(10) Patent No.: US 8,827,434 B2
(45) Date of Patent: Sep. 9, 2014

(54) INK FOR INK JET RECORDING, INK JET RECORDING DEVICE, IMAGE FORMING METHOD, AND IMAGE RECORDED MEDIUM

(75) Inventors: Minoru Hakiri, Shizuoka (JP); Mitsuru Naruse, Shizuoka (JP); Naoya Morohoshi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 449 days.

(21) Appl. No.: 13/270,374

(22) Filed: Oct. 11, 2011

(65) Prior Publication Data

US 2012/0092411 A1    Apr. 19, 2012

(30) Foreign Application Priority Data

Oct. 19, 2010  (JP) ................. 2010-234499

(51) Int. Cl.
*B41J 2/01* (2006.01)
*B41J 2/21* (2006.01)
*C09D 11/326* (2014.01)

(52) U.S. Cl.
CPC .............. *B41J 2/2107* (2013.01); *C09D 11/326* (2013.01)
USPC .............................................. 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............. 347/100, 95, 96, 101, 102, 20, 21, 9, 347/88, 99, 105; 106/31.6, 31.27, 31.13; 523/160, 161
See application file for complete search history.

(56) References Cited

U.S. PATENT DOCUMENTS

| | | | |
|---|---|---|---|
| 6,767,090 B2 * | 7/2004 | Yatake et al. | 347/100 |
| 6,786,959 B2 | 9/2004 | Hakiri et al. | |
| 7,008,994 B1 * | 3/2006 | Waki | 523/160 |
| 7,101,919 B2 | 9/2006 | Hasegawa et al. | |
| 7,490,930 B2 | 2/2009 | Morohoshi et al. | |
| 7,798,629 B2 | 9/2010 | Hakiri et al. | |
| 7,815,301 B2 | 10/2010 | Hasegawa et al. | |
| 7,892,340 B2 | 2/2011 | Namba et al. | |
| 7,919,544 B2 | 4/2011 | Matsuyama et al. | |
| 7,938,527 B2 | 5/2011 | Ohshima et al. | |
| 2003/0196568 A1 * | 10/2003 | Miyamoto et al. | 106/31.58 |
| 2004/0017454 A1 * | 1/2004 | Yoshizawa et al. | 347/102 |
| 2004/0039081 A1 * | 2/2004 | Kawaguchi | 523/160 |
| 2006/0272543 A1 | 12/2006 | Hakiri et al. | |
| 2006/0279621 A1 | 12/2006 | Morohoshi | |
| 2007/0044684 A1 * | 3/2007 | Nakano et al. | 106/31.86 |
| 2007/0088101 A1 * | 4/2007 | Iu et al. | 523/160 |
| 2007/0197685 A1 | 8/2007 | Aruga et al. | |
| 2008/0036830 A1 | 2/2008 | Natori et al. | |
| 2008/0273045 A1 | 11/2008 | Morohoshi et al. | |
| 2009/0114121 A1 | 5/2009 | Morohoshi et al. | |
| 2009/0130313 A1 | 5/2009 | Ohshima et al. | |
| 2009/0135218 A1 | 5/2009 | Morohoshi et al. | |
| 2009/0162569 A1 | 6/2009 | Morohoshi et al. | |
| 2009/0186162 A1 | 7/2009 | Namba et al. | |
| 2009/0263632 A1 | 10/2009 | Kojima et al. | |
| 2009/0291213 A1 | 11/2009 | Ohshima et al. | |
| 2010/0215855 A1 | 8/2010 | Morohoshi et al. | |
| 2010/0245416 A1 | 9/2010 | Ohshima et al. | |
| 2010/0277541 A1 | 11/2010 | Watanabe et al. | |
| 2010/0277548 A1 | 11/2010 | Hakiri et al. | |
| 2010/0279035 A1 | 11/2010 | Namba et al. | |
| 2010/0302306 A1 | 12/2010 | Hasegawa et al. | |
| 2010/0302326 A1 | 12/2010 | Morohoshi et al. | |
| 2010/0309260 A1 | 12/2010 | Hakiri et al. | |
| 2011/0057981 A1 | 3/2011 | Aruga et al. | |
| 2011/0071250 A1 | 3/2011 | Naruse et al. | |
| 2011/0074865 A1 | 3/2011 | Hasegawa et al. | |

FOREIGN PATENT DOCUMENTS

| | | |
|---|---|---|
| JP | 56-147871 | 11/1981 |
| JP | 8-283633 | 10/1996 |
| JP | 10-298469 | 11/1998 |
| JP | 2001-353861 | 12/2001 |
| JP | 2004-83688 | 3/2004 |
| JP | 2009-221282 | 10/2009 |
| JP | 2009-241586 | 10/2009 |

* cited by examiner

*Primary Examiner* — Manish S Shah
(74) *Attorney, Agent, or Firm* — Cooper & Dunham LLP

(57) ABSTRACT

Ink for ink jet recording containing a coloring agent, water, an aqueous organic solvent, and a polyacrylic acid ester-based polymer represented by the following chemical structure 1:

Chemical structure 1

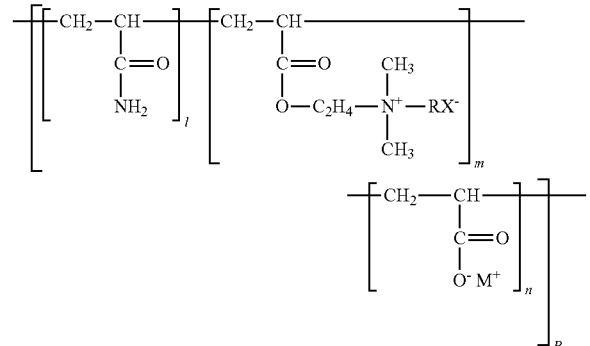

where R represents a hydrogen atom and a methyl group, X— represents F—, Cl—, and Br—, M+ represents Na+, K+, NH4+, and Li+, and symbols l, m, n, and p independently represent integers of from 10 to 3,000.

6 Claims, 1 Drawing Sheet

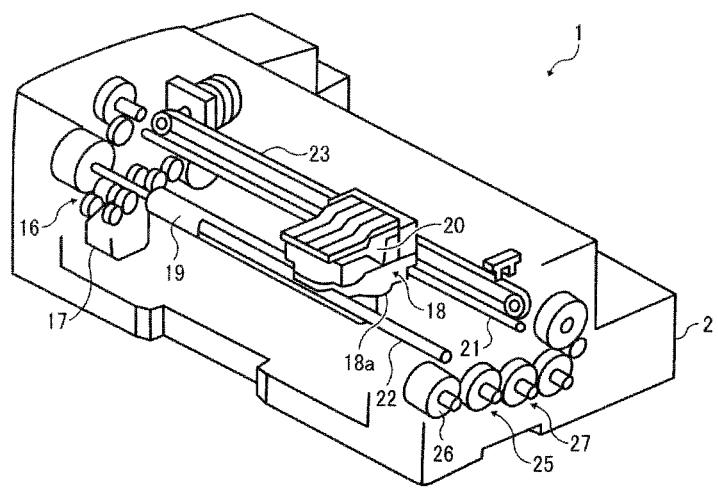

INK FOR INK JET RECORDING, INK JET RECORDING DEVICE, IMAGE FORMING METHOD, AND IMAGE RECORDED MEDIUM

CROSS-REFERENCE TO RELATED APPLICATIONS

This patent application is based on and claims priority pursuant to 35 U.S.C. §119 to Japanese Patent Application No. 2010-234499, filed on Oct. 19, 2010, in the Japan Patent Office, the entire disclosure of which is hereby incorporated by reference herein.

BACKGROUND OF THE INVENTION

1. Field of the Invention

The present invention relates to ink for ink jet recording, an ink cartridge, an ink jet recording device, an image forming method, and an image recorded medium.

2. Description of the Background Art

Ink jet recording methods are advantageous in comparison with other recording methods in that the process is simple, full colorization is easy, and quality images can be obtained using a relatively simple mechanical configuration.

Dye-based ink, in which various aqueous soluble dyes are dissolved in water or a mixture of water and an organic solvent, is used as the ink for ink jet recording. Such a dye is excellent for forming vivid color images but tends to fade with prolonged exposure to light.

On the other hand, pigment-based ink, in which carbon black and various organic pigments are dispersed, has been actively researched and developed because it has excellent light resistance relative to the dye-based ink described above, although it tends to clog the printer nozzles. In general, pigment-based inks are prepared by preliminarily dispersing a pigment and a dispersing agent in an aqueous medium such as water and alcohols, conducting dispersion by a media-type dispersing machine such as a sand mill to a certain degree to prepare a liquid dispersion of the pigment, and diluting the liquid dispersion to a predetermined concentration by addition of other materials such as additives. A surface active agent or a water-soluble resin is generally used to disperse the pigment, which is hydrophobic. However, the quality of obtained images is extremely poor.

Adding resin particulates having a film-forming property to ink is known to improve image quality. However, it is difficult to stably disperse multiple particulate components for a long period of time, which leads to an increase of the amount of a dispersing agent such as a surface active agent for stable dispersion. This causes problems such as occurrence of bubbles in an ink tank and an ink head and deterioration of image quality.

In addition, to improve the dispersion property, a method of changing the pigment surface to have a hydrophilic group and a method of using a resin having a hydrophilic group have been studied. These involve a problem that, although they are separately stable, dispersion becomes unstable when different kinds of pigments or resins are mixed, which results in poor stability.

Unexamined Japanese patent application publication no. S56-147871 (JP-S56-147871-A) describes use of polymers. But with advances in contemporary ink jet printers, the ink head, etc. tends to clog with pigments having a particle diameter of from several μm to several hundred μm as described in this application publication, and image quality easily becomes unsatisfactory. In addition, stability is also poor.

JP-H8-283633-A describes a usage of a water-soluble polymer having a molecular weight of from 2,000 to 1,000,000 and JP-2009-241586 describes a usage of resin particles having a molecular weight of from 8,000 to 100,000.

JP-H10-298469-A describes a recording liquid using a polymer agglomerating agent generally having a molecular weight of from about several millions to about ten and several millions with a sole specific example of a methylchloride quaternary salt homopolymer of a methacrylate in Examples.

SUMMARY OF THE INVENTION

In view of the foregoing, the present invention provides a novel ink for ink jet recording containing a coloring agent, water, an aqueous organic solvent, and a polyacrylic acid ester-based polymer represented by the following chemical structure 1:

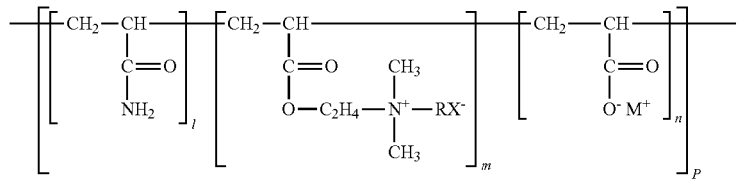

Chemical structure 1 where R represents a hydrogen atom and a methyl group, X— represents F—, Cl—, and Br—, M+ represents Na+, K+, NH4+, and Li+, and symbols l, m, n, and p independently represent integers of from 10 to 3,000.

It is preferred that the ink for ink jet recording further contains an anionic self-emulsification type ether-based polyurethane resin emulsion.

As another aspect of the present invention, an ink cartridge is provided which includes a container to house the ink for ink jet recording mentioned above.

As another aspect of the present invention, an ink jet recording device is provided which includes the ink cartridge mentioned above.

As another aspect of the present invention, an image forming method is provided which includes printing images on a medium using the ink for ink jet recording mentioned above.

As another aspect of the present invention, an image recorded medium is provided which is formed by the image forming method mentioned above.

BRIEF DESCRIPTION OF THE DRAWING

Various other objects, features and attendant advantages of the present invention will be more fully appreciated as the same becomes better understood from the detailed descrip- FIGURE is a diagram illustrating an example of an ink jet recording device of the present disclosure.

DETAILED DESCRIPTION OF THE INVENTION

The present disclosure will be described below in detail with reference to several embodiments and accompanying drawing.

The ink for ink jet recording of the present disclosure uses a polyacrylic acid ester-based polymer represented by the following chemical structure 1.

Chemical structure 1

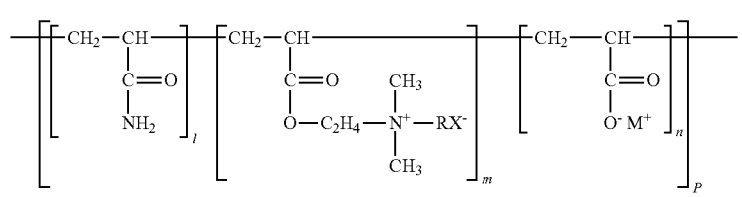

In the chemical structure 1, R represents a hydrogen atom and a methyl group, $X^-$ represents $F^-$, $Cl^-$, and $Br^-$, $M^+$ represents $Na^+$, $K^+$, $NH_4^+$, and $Li^+$. Symbols l, m, n, and p represent integers of from 10 to 3,000.

The weight average molecular weight of the polyacrylic acid ester-based polymer is preferably from about one to eight million. When the weight molecular weight is too small, the agglomeration effect tends to be insufficient, which leads to have an adverse impact on the image density and stability. When the weight molecular weight is too large, the ink viscosity tends to be high, which gives problems about the ink discharging stability, stability, etc.

Specific examples of the polyacrylic acid ester-based polymer include, but are not limited to, CX-100 (molecular weight: 5,500,000), CX-200 (molecular weight: 7,500,000), CX-300 (molecular weight: 5,500,000), and CX-400 (molecular weight: 7,500,000), all of which are manufactured by DAI-ICHI KOGYO SEIYAKU CO., LTD.

The polyacrylic acid ester-based polymer can be used as a dispersing agent for a pigment liquid dispersion or an additive for ink. To obtain a high definition image density, it is preferably used as a dispersing agent for a pigment liquid dispersion. The reason is that if a polyacrylic acid ester-based polymer is present in the vicinity of a pigment in the process of ink permeation on paper that forms an image recorded medium after the ink lands on the paper, the pigment and cation portions approach become close to each other as the amount of the solid portion increases. This improves adsorption, resulting in agglomeration. Therefore, it is inferred that permeation of pigment into paper is reduced and most pigment remain on the surface of the paper, which contributes to high image density. That is, in comparison with a case in which the polyacrylic acid ester-based polymer is used as an additive for ink, the image density is high in a case in which the polyacrylic acid ester-based polymer is used as a dispersing agent because the polyacrylic acid ester-based polymer and the pigment are present closer to each other. This is particularly apparent when carbon black is used as a pigment.

There is no specific limitation to the selection of a coloring material. For examples, inorganic pigments and organic pigments can be used suitably.

Specific examples of the inorganic pigments include, but are not limited to, titanium oxide, iron oxide, calcium oxide, barium sulfate, aluminum hydroxide, barium yellow, chrome yellow, and carbon black. Among these, carbon black is preferable. Carbon black that is manufactured by, for example, a known method such as a contact method, a furnace method, and a thermal method can be used.

Specific examples of the organic pigments include, but are not limited to, azo pigments, polycyclic pigments, dye chleates, nitoro pigments, nitroso pigments, and aniline black. Among these, azo pigments and polycyclic pigments are more preferable. Specific examples of the azo pigments include, but are not limited to, azo lake, insoluble azo pigments, condensation azo pigments, and chleate azo pigments.

Specific examples of the polycyclic pigments include, but are not limited to, phthalocyanine pigments, perylene pigments, perynone pigments, anthraquinone pigments, quinacridone pigments, dioxazine pigments, indigo pigments, thioindigo pigments, isoindorinone pigments, and quinofraron. Specific examples of the dye chleates include, but are not limited to, bass dye type chleates and acid dye type chleates.

There is no specific limit to the selection of the color of the pigments. Pigments for black color and pigments for color can be used. These can be used alone or in combination.

Specific examples of the pigments for black color include, but are not limited to, carbon black such as furnace black, lamp black, acetylene black, and channel black (C.I. Pigment Black 7), metals such as copper and iron (C.I. Pigment Black 11), metal compounds such as titanium oxide, and organic pigments such as aniline black (C.I. Pigment Black 1). Specific examples of carbon black include, but are not limited to, products manufactured by Mitsubishi Chemical Corporation such as #10B, #30, #33, #40, #44, #45, #45L, #50, #55, #95, #260, #900, #1000, #2200B, #2300, #2350, #2400B, #2650, #2700, #4000B, CF9, MA8, MA1, MA77, MA100, MA220, MA230, MA600, and MCF88; products manufactured by Cabot Corporation such as MONARH 120, MONARH 700, MONARH 800, MONARH 880, MONARH 1000, MONARH 1300, MONARH 1400, REGAL L, REGAL 99R, REGAL 250R, REGAL 300R, REGAL 330R, REGAL 400R, REGAL 500R, AND REGAL 660R; and products manufactured by Evonik Degusa Japan, Co., Ltd such as PRINTEX A, PRINTEX G, PRINTEX U, PRINTEX V, PRINTEX 55, PRINTEX 140U, PRINTEX 140V, SPECIAL BLACK 4, SPECIAL BLACK 4A, SPECIAL BLACK 5, SPECIAL BLACK 6, SPECIAL BLACK 100, SPECIAL BLACK 250, COLOR BLACK FW1, COLOR BLACK FW2, COLOR BLACK FW2V, COLOR BLACK FW18, COLOR BLACK FW200, COLOR BLACK 5150, COLOR BLACK 160, and Color BLACK 170.

Specific examples of the pigments for yellow color include, but are not limited to, C.I. Pigment Yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, and 153.

Specific examples of the pigments for magenta color include, but are not limited to, C.I. Pigment Red 1, 2, 3, 5, 17, 22 (brilliant fast scarlet), 23, 31, 38, 48:2 [permanent red 2B(Ba)], 48:2 [Permanent Red 2B (Ca)], 48:3 [Permanent Red 2B(Sr)], 48:4 [Permanent Red 2B(Mn)], 49:1, 52:2, 53:1, 57:1 (Brilliant Carmine 6B), 60:1, 63:1, 63:2, 64:1, 81 (Rhodamine 6G Lake), 83, 88, 92, 101 (rouge), 104, 105, 106, 108 (cadmium red), 112, 114, 122 (dimethylquinacridone), 123, 146, 149, 166, 168, 170, 172, 177, 178, 179, 185, 190, 193, 209, and 219.

Specific examples of the pigments for cyan color include, but are not limited to, C.I. Pigment Blue 1, 2, 15 (copper phthalocyanine blue R), 15:1, 15:2, 15:3 (copper phthalocyanine blue G), 15:4, 15:6 (phthalocyanine blue E), 16, 17:1, 56, 60, and 63. In addition, the following can be used for intermediate colors of red, green, and blue: C.I.

Pigment Red 177, 194, 224, C.I. Pigment Orange 43, C.I. Pigment Violet 3, 19, 23, 37, and C.I. Pigment Green 7 and 36.

The pigment can be generally used as a pigment liquid dispersion. The pigment liquid dispersion can be obtained by dispersing a pigment, a dispersing agent, water, and an optional additive agent with a dispersing machine such as a bead mill such as DYNO-MILL KDL type (manufactured by Shinmaru Enterprises Corporation), an agitator mill LMZ (manufactured by Ashizawa Finetech Ltd.), an SC mill (manufactured by NIPPON COKE & ENGINEERING. CO., LTD.) followed by dispersion using a beadless mill such as a high speed shearing type machine such as CLEARSSS (manufactured by M Technique Co., Ltd.), Cavitron CD1010 (manufactured by EUROTEC, LTD), and Module DR2000 (manufactured by Shinmaru Enterprises Corporation), a thin film swirling type machine such as T.K.Filmix (manufactured by Primix Corporation), and an ultra high pressure collision type machine such as Ultimizer (manufactured by SUGINO MACHINE LIMITED) and Nanomizer (manufactured by Yoshida Kikai Co., Ltd.).

Beads are generally ceramic beads, typically zirconia balls. The diameter of the bead is preferably 0.05 mm $\Phi$ or less and more preferably 0.03 mm $\Phi$ or less.

In addition, the particle size distribution can be made sharper by pre-processing coarse particles by, for example, a Homogenizer in the pre-process of the dispersing machine, which leads to improvement on the image density and discharging stability.

The thus-obtained pigment liquid dispersion is suitably used as a material for ink for ink jet recording using a pigment in particular.

The pigment density is preferably from 5 to 50% by weight based on the total weight of the liquid dispersion. When the pigment density is too low, the productivity tends to be excessively low. When the pigment density is too high, the viscosity of the liquid dispersion tends to be too high, which makes dispersion difficult.

Furthermore, it is preferable to contain a dispersing agent in an amount of from 0.005 to 0.5 and more preferably from 0.025 to 0.12 in mass based on the pigment. In this range, a pigment liquid dispersion that contributes to a high image density, a good discharging stability, and a good liquid stability can be obtained.

As the dispersing agent, it is suitable to use a surface active agent such as an anion surface active agent, a cation surface active agent, an amphoteric surface active agent, and a nonion surface active agent and a polymer type dispersing agent in addition to the polyacrylic acid ester-based polymer. These can be used in combination with the polyacrylic acid ester-based polymer.

Specific examples of the anion surface active agent include, but are not limited to, alkyl sulfocarboxylix acid salts, $\alpha$-olefin sulfonic acid salts, polyoxyethylene alkyl ether acetic acid salts, N-acyl amino acid and salts thereof, N-acyl methyl taurine salts, alkyl sulfuric acid salt polyoxyalkylether sulfuric acid salts, alkyl sulfuric acid salt polyoxyethylene alkyl ether phosphoric acid, rosin acid soap, castor oil sulfuric acid ester salts, lauryl alcohol sulfuric acid ester salts, alkyl phenol type phosphoric acid esters, formalin condensation products of naphthalene sulfonic acid salts, alkyl type phosphoric acid esters, alkyl aryl sulfonic acid salts, diethyl sulfosuccinic acid salts, and diethyl hexyl sulfosuccinic acid dioctyl sulfosuccinic acid salts.

Specific examples of the cation surface active agent include, but are not limited to, 2-vinylpyridine derivatives and poly-4-vinylpyridine derivatives.

Specific examples of the amphoteric surface active agent include, but are not limited to, lauryl dimethylamino acetic acid betaine, 2-alkyl-N-carboxymethyl-N-hydroxyethyl imidazolinium betaine, coconut oil fatty acid amidepropyl dimethyl amino acetic acid betaine, polyoctyl polyaminoethyl glycine, and imidazoline derivatives.

Specific examples of the nonion surface active agent include, but are not limited to, the following: ethers such as polyoxyethylene nonyl phenyl ethers, polyoxyethylene octylphenyl ethers, polyoxyethylene dodecyl phenyl ethers, polyoxyethylene lauryl ethers, polyoxyethylene oleyl ethers, polyoxyethylene alkyl ethers, and polyoxyethylene aryl alkylethers;

esters such as polyoxyethylene oleic acid esters, polyoxyethylene oleic acid esters, polyoxyethylene distearic acid esters, sorbitan laurate, sorbitan monostearate, sorbitan monooleate, sorbitan sesquioleate, polyoxyethylene monooleate, and polyoxyethylene stearate; and acetylene glycols such as 2,4,7,9-tetramethyl-5-desine-4,7-diol, 3,6-dimethyl-4-octine-3,6-diol, and 3,5-dimethyl-1-hexine-3-ol.

In addition, it is preferable to add anionic self-emulsification type ether-based polyurethane resin emulsion (i.e., polyurethane resin emulsion a) to the pigment liquid dispersion to improve the dispersion stability thereof. Polyurethane resin emulsions are classified into emulsions prepared by emulsifying a typical polyurethane resin having a relatively hydrorophillic property and self-emulsification type emulsions prepared by introducing a functional group serving as an emulsifier to a resin by copolymerization, etc.

The self-emulsification type polyurethane resins include, but are not limited to, ether based resins, polyester-based resins, and polycarbonate-based resins. The ether based resins are always excellent in adherence and dispersion stability of a pigment and in the dispersion stability in various combinations with dispersing agents. To the contrary, the solvent resistance of most of the other-based resins is not good enough so that the pigment tends to agglomerate while the ink is preserved in a high temperature environment.

The volume average particle diameter (D50) of the polyurethane resin emulsion a is 50 nm or less, preferably 25 nm or less, and more preferably 15 nm or less. The D50 is measured by MicroTrack UPA (manufactured by Nikkiso Co., Ltd.) at 23° C. and 55% RH.

Gas black type carbon black has a good compatibility with a polyurethane resin emulsion a having a small average particle diameter, in which dispersion seems to be stabilized.

In particular, trouble that ink is not discharged while an ink jet printer is in operation to print images is prevented more effectively by adjusting the average particle diameter to be 50 nm or less.

If the ink is not discharged, printing resumes by cleaning the ink flow passage including nozzles in an ink jet printer, which is impractical.

The glass transition temperature of the polyurethane resin emulsion a preferably ranges from −50° C. to 150° C. and more preferably from −10° C. to 100° C. It is not known exactly why but when the glass transition temperature is too high, although the ether-based polyurethane resin film is glassy and hard, the printed portion which is made when pigment particles and ether-based polyurethane resins land on a medium at the same time tends to have unexpectedly weak abrasion resistance.

However, when the glass transition temperature is 150° C. or lower, the abrasion resistance of the film is good even though the film is polyurethane and soft.

To the contrary, when the glass transition is too low, the film tends to be too soft to have a good abrasion resistance. As described above, the abrasion resistance is good when the glass transition temperature is within the range specified above for the same added amount. The glass transition temperature of the resin in the present disclosure is obtained by a DSC (differential scanning calorimeter) or TMA (thermomechanical analysis).

The polyurethane resin emulsion α preferably has a minimum film-forming temperature (MFT) below room temperature and more preferably 25° C. or lower. If the film of the polyurethane resin emulsion α is formed below room temperature, 25° C. or lower in particular, adhesion of paper fiber of a medium on which an image is formed proceeds automatically without heating or drying, which is preferable. The minimum film-forming temperature (MFT) represents the lowest temperature at which aqueous emulsion particles, which are obtained by dispersing the polyurethane resin emulsion a particles in water, form a transparent continuous film by thinly casting and heating the particles on a metal plate such as aluminum. The aqueous emulsion particles are white powder in the temperature range of the minimum film-forming temperature or lower.

Film-forming represents that resin film is formed by evaporating moisture of a continuous layer of resin emulsions prepared by dispersing resin particulates in water. This resin film functions to firmly attach the pigments in ink to the surface of a medium. As a result, images having excellent abrasion resistance and water resistance are obtained.

Ether-based polyurethane resin emulsion particles are not necessarily put in the pigment liquid dispersion for use in the present disclosure but can be added later during ink preparation.

The ink of the present disclosure is obtained by a known manufacturing method such that a pigment liquid dispersion, water, a water-soluble organic solvent, a surface active agent, etc. are stirred and mixed followed by filtration of coarse particles using a filter, a centrifugal, etc. and optional degassing.

The density of coloring agents in ink is preferably from 1 to 20% by weight based on the total weight of ink. In this range, vivid images can be obtained with a sufficient image density and it does not occur that the viscosity of the ink increases excessively, thereby causing nozzles to clog.

Optionally, various additives such as resins, wetting agents, surface active agents, penetrating agents, pH adjusters, anti-septic and anti-fungul agents, chleate reagents, anti-corrosion agents, anti-oxidants, ultraviolet absorbers, oxygen absorbers, and photostabilizing agents can be blended in the ink of the present disclosure, if desired. These additives, for the most part, can be added to the pigment liquid dispersion, if necessary.

There is no specific limitation to the selection of the wetting agents and any known wetting agents can be suitably used. Specific examples of the wetting agents include, but are not limited to, polyols, polyol alkyl ethers, polyol aryl ethers, nitrogen-containing heterocyclic compounds, amides, amines, sulfur-containing compounds, propylene carbonates, and ethylene carbonate. These can be used alone or in combination.

Specific examples of the polyols include, but are not limited to, ethylene glycol, diethylene glycol, triethylene glycol, tetraethylene glycol, polyethylene glycol, polypropylene glycol, dipolypropylene glycol, tripolypropylene glycol, polypropylene glycol, 1,3-butane diol, 3-methyl-1,3-butane diol, 1,5-pentane diol, 1,6-hexane diol, glycerine, trimethylol ethane, trimethylol propane, 1,2,3-butane triol, 1,2,4-butane triol, 1,2,6-hexane triol, and petriol.

Specific examples of the polyol alkyl ethers include, but are not limited to, ethylene glycol monoethylether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of the nitrogen-containing heterocyclic compounds include, but are not limited to, 2-pyrolidone, N-methyl-2-pyrolidone, N-hydroxyethyle-2-pyrolidone, 1,3-dimethylimidazoline, ε-caprolactam, and γ-butyrolactone.

Specific examples of the amides include, but are not limited to, formamide, N-methylformamide, and N,N-dimethylformamide.

Specific examples of the amines include, but are not limited to, monoethanol amine, diethanol amine, triethanol amine, monoethyl amine, diethylamine, and triethyl amine Specific examples of the sulfur-containing compounds include, but are not limited to, dimethyl sulphoxide, sulfolane, and thiodiethanol.

Sugar groups are also preferable as wetting agents. Specific examples of the sugar groups include, but are not limited to, monosaccharides, disaccharides, oligosaccharides (including trisaccharides and tetrasaccharides), and polysaccharides.

Specific examples thereof include, but are not limited to, glucose, mannose, fructose, ribose, xylose, arabinose, galactose, maltose, cellobiose, lactose, saccharose, trehalose, and maltotriose. Oligosaccharides represent sugar in a broad sense and contain materials that occur widely in nature, for example, α-cyclodextrine and cellulose. Specific examples of derivatives of these sugars include, but are not limited to, reduction sugars (e.g., sugar alcohols represented by the chemical structure: $HOCH_2(CHOH)_nCH_2OH$, where a symbol n represents an integer of from 2 to 5), oxidized saccharides (such as aldonic acid and uronic acid), amino acids, and thio acid. Among these, sugar alcohols are preferable and specific examples thereof include, but are not limited to, maltitol and sorbitol.

Among these wetting agents, glycerine, diethylene glycol, triethylene glycol, 1,3-butane diol, 3-methyl-1,3-butane diol, 2-pyrolidone and N-methyl-2-pyrolidone are particularly preferable in terms of stability and the discharging stability.

The blend ratio of the pigment and the wetting agent has a large impact on the discharging stability of ink from a head. If the blend amount of the wetting agent is too small in comparison with the amount of the pigment solid portion, water evaporation around ink meniscus of nozzles tends to be accelerated, thereby causing bad discharging.

The content of the wetting agent in ink is about from 20% to 35% by weight and preferably from 22.5% to 32.5% by weight. In this range, the drying property of ink and the results of the stability test and the reliability test thereof are extremely good. When the content ratio is too small, ink is easily dried on the surface of nozzles, thereby causing bad discharging. When the content ratio is too large, the drying property of the ink on paper is inferior so that the quality of text on plain paper may deteriorate.

A surface active agent that has a low surface tension and a high leveling property without degrading the dispersion stability is used in accordance with the kind of a pigment and a combination with a wetting agent. For example, fluorine-based surface active agents and silicone-based surface active agents can be used. Fluorine-based surface active agents are preferable.

A fluorine-based surface active agent in which the number of carbon atoms replaced with fluorine atoms is from 2 to 16 is preferable and, 4 to 16 more preferable. When the number of replaced carbon atoms with fluorine atoms is too small, the effect of fluorine atoms may not be demonstrated. When the number of replaced carbon atoms with fluorine atoms is too large, a problem with regard to the ink preservability, etc. may occur.

Specific examples of the fluorine-based surface active agents include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. Among these, polyoxyalkylene ether polymer compounds having a perfluoroalkyl ether group in its side chain are particularly preferable because of Its small foaming property.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorine-based surface active agents are, for example, Li, Ha, K, $NH_4$, $NH_3CH_2CH_2CH$, $NH_2(CH_2CH_2OH)_2$, and $NH(CH_2CH_2OH)_3$.

Any suitably synthesized fluorine-based surface active agent and products thereof available in the market can be also used. Specific examples of the products available in the market include, but are not limited to, FS-300 manufactured by Du Pont Kabushiki Kaisha), FT-110, FT-250, FT-251, FT-400S, FT-150, and FT-400SW (manufactured by Neos Company Limited), and PF-151N (manufactured by Omnova Solutions, Inc.).

There is no specific limitation to the selection of the silicone-based surface active agents and a silicone-based surface active agent is preferable which is not decomposed even at a high pH. Specific examples thereof include, but are not limited to, side-chain-modified polydimethylsiloxane, both end-modified polydimethylsiloxane, one end modified polydimethylsiloxane, and side-chain both end modified polydimethylsiloxane. A silicone-based surface active agent that has a polyoxyethylene group and/or a polyoxyethylene polyoxypropylene group is particularly preferable because such an agent demonstrates good characteristics as an aqueous surface active agent.

Any suitably synthesized silicone-based surface active agent and products thereof available in the market can be also used. Products available in the market are easily obtained by Byc Chemie Japan Co., Ltd., Shin-Etsu Silicone Co., Ltd., Dow Corning Toray Co., Ltd., etc.

The content of the surface active agent in ink is preferably from 0.01% to 3.0% by weight and more preferably from 0.5% to 2.0% by weight. When the content is too small, the surface active agent is difficult to demonstrate its effect. When the content is too large, penetration of ink to a recording medium tends to become excessively high, resulting in reduction of image density and occurrence of strike-through.

It is preferable that at least one kind of polyol compounds having a solubility of from 0.2% to 5.0% by weight to water at 20° C. is contained as the penetrating agents. As a result, oozing does not occur by causing the pigment to remain on the surface while increasing the permeability of ink at the same time, thereby producing printed images having a high image density with less strike-through.

Specific examples of polyol compounds include, but are not limited to, aliphatic diols such as 2-methyl-2-ethyl-1,3-propanediol, 2,2-diethyl-1,3-propane diol, 2-methyl-2-propyl-1,3-propane diol, 3,3-dimethyl-1,2-butane diol, 2,4-dimethyl-2,4-pentane diol, 2,2,4-trimethyl-1,3-pentane diol, 2,5-dimethyl-2,5-hexane diol, 2-ethyl-1,3-hexane diol, and 5-hexane-1,2-diol. Among these, 2-ethyl-1,3-hexane diol and 2,2,4-trimethyl-1,3-pentane diol are particularly preferable.

Any other permeating agents that can be dissolved in ink and adjusted to have desired characteristics can be used in combination. Specific examples thereof include, but are not limited to, alkyl and aryl ethers of polyols such as ethylene glycol monophenylether, ethylene glycol monoaryl ether, diethylene glycol monophenyl ether, diethylene glycol monobutyl ether, propylene glycol monobutyl ether, and tetraethylene glycol chlorophenyl ether and lower alcohols such as ethanol.

The content of the permeating agent in ink is preferably from 0.1% to 4% by weight. When the content is too small, the image obtained may not dry soon, resulting in an oozed image. When the content is too large, the dispersion stability of the coloring agent may deteriorate, nozzles tends to clog, and the permeability tends to be excessively high, which leads to decrease of the image density and occurrence of strike-through.

Any pH adjusters that can adjust pH to be from 7 to 11 without having an adverse impact on ink can be used. Specific examples thereof include, but are not limited to, alcohol amines, alkali metal hydroxides, ammonium hydroxides, phosphonium hydroxides, and alkali metal carbonates. When the pH is too high or too low, the dissolved content of the head of ink jet and an ink supplying unit tends to increase, which leads to problems such as modification, leakage, and bad discharging of ink.

Specific examples of the alcohol amines include, but are not limited to, diethanol amine, triethanol amine, and 2-ethyl-2-amino-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide and quaternary ammonium hydroxide.

Specific examples of phosphonium hydroxides include, but are not limited to, (1,3-dioxolane-2-yl)methyl triphenylphosphonium bromide, (1-naphtylmethyl)triphenyl phosphonium chloride, and (2,4-dichlorobenzyl)triphenyl phosphonium chloride.

Specific examples of the alkali metal carbonates include, but are not limited to, lithium carbonate, sodium carbonate, and potassium carbonate.

Specific examples of the anti-septic and anti-fungul agents include, but are not limited, dehydrosodium acetate, sodium sorbinate, 2-pyridine thiol-1-oxide sodium, sodium benzoate, and pentachlorophenol sodium.

Specific examples of the chleate reagents include, but are not limited to, ethylene diamine sodium tetraacetate, nitrilo sodium triacetate, hydroxyethylethylene diamine sodium triacetate, diethylene triamine sodium quinternary acetate, and uramil sodium diacetate.

Specific examples of the anti-corrosion agents include, but are not limited to, acid sulfite, thiosodium sulfate, ammonium thiodiglycolate, diisopropyl ammonium nitride, pentaerythritol quaternary nitdride, and dicyclohexyl ammonium nitride.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the phenol-based anti-oxidants (including hindered phenol-based anti-oxidants) include, but are not limited to, butylated hydroxy anisol, 2,6-di-tert-butyl-4-ethylphenol, stearyl-β-(3,5-di-tert-butyl-4-hydroxyphenyl) propionate, 2,2'-methylenebis(4-methyl-6-tert-butylphenol), 2,2',-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenonl)propyonyloxy]ethyl-2,4,8-10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, and tetrakis [methylene-3-(3',5'-di-tert-butyl-4'-hydroxyphenyl)propionate]methane.

Specific examples of the amine-based anti-oxidants include, but are not limited to, phenyl-β-naphtylamine, α-naphtyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxyanisole, 2,2'-methylenebis (4-methyl-6-tert-butylphenol), 4,4'-butylidenebis(3-methyl-6-tert-butylphenol), 4,4'-thiobis(3-methyl-6-tert-butylphenol), tetrakis(methylene-3-(3,5-di-tert-butyl-4-dihydroxyphenyl)propionate]methane, and 1,1,3-tris(2-methyl-4-hydroxy-5-tert-butylphenyl)butane.

Specific examples of the sulfur-based anti-oxidants include, but are not limited to, dilauryl-3,3'-thiodipropionate, distearylthiodipropionate, laurylstearylthiodipropionate, dimyristyl-3,3'-thiodipropionate, distearyl-β,β'-thiodipropionate, 2-mercaptobenzo imidazole, and dilauryl sulfide.

Specific examples of the phosphorous-based anti-oxidants include, but are not limited to, triphenylphosphite, octadecylphosphite, triisodecylphosphite, trilauryltrithiophosphite, and trinonylphenyl phosphite.

Specific examples of the ultraviolet absorbers include, but are not limited to, benzophenone-based ultraviolet absorbents, benzotriazole-based ultraviolet absorbents, salicate-based ultraviolet absorbents, cyanoacrylate-based ultraviolet absorbents, and nickel complex salt-based ultraviolet absorbents.

Specific examples of the benzophenone-based ultraviolet absorbers include, but are not limited to, 2-hydroxy-4-n-octoxybenzophenone, 2-hydroxy-4-n-dodecyloxy benzophenone, 2,4-dihydroxybenzophenone, 2-hydroxy-4-methoxybenzophenone, and 2,2',44'-tetrahydroxybenzophenone.

Specific examples of the benzotriazole-based ultraviolet absorbers include, but are not limited to, 2-(2'-hydroxy-5'-tert-octylphenyl)benzotriazole, 2-(2'-hydrozy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Specific examples of the salicylate-based ultraviolet absorbers include, but are not limited to, phenyl salicylate, p-tert-butylphenyl salicylate, and p-octylphenyl salicylate.

Specific examples of the cyanoacrylate-based ultraviolet absorbers include, but are not limited to, ethyl-2-cyano-3,3'-diphenylacrylate, methyl-2-cyano-3-methyl-3-(p-nethoxyphenyl)acrylate, and butyl-2-cyano-3-methyl-3-(p-methoxyphenyl)acrylate.

Specific examples of the nickel complex salt-based ultraviolet absorbers include, but are not limited to, nickel-bis (octylphenyl)sulfide, 2,2'-thiobis(4-tert-octylphalate)-n-butylamine nickel (II), 2,2'-thiobis(4-tert-octylphalate)-2-ethylhexyl amine nickel (II), and 2,2'-thiobis(4-tert-octylphalate)triethanol amine nickel (II).

The ink cartridge of the present disclosure has a container that accommodates the ink of the present disclosure. There is no specific limitation to the container. Any form, any structure, any size, and any material can be suitably selected. For example, an ink bag formed of aluminum laminate film, a resin film, etc. or a plastic case can be used.

The ink jet recording device of the present invention has the ink cartridge and a head employing a system in which ink is discharged for recording.

Ink can be discharged by methods such as continuous jetting and on-demand. The on-demand type includes a piezo system, a thermal system, and an electrostatic system.

The ink cartridge and the ink jet recording device of the present disclosure are described in detail with reference to FIGURE.

In FIGURE, an ink cartridge 20 that accommodates the ink of the present disclosure for ink jet recording is housed in a carriage 18. Although multiple ink cartridges 20 are provided for convenience, a single cartridge 20 is also suitable. The ink for ink jet recording is supplied from the ink cartridge 20 to a droplet discharging head 18a installed on the carriage 18. In Figure, the discharging nozzle phase is directed downward and thus is unseen. The ink for ink jet recording is discharged from this discharging nozzle.

The liquid discharging head 18a installed on the carriage 18 is moved and guided by guide shafts 21 and 22 by a timing belt 23 driven by a main scanning motor 26.

A specific coated paper (medium) is placed at the position opposing the liquid discharging head 18a by a platen 19. In Figure, numeral references 1, 2, 16, 17, and 25 and 27 represent an ink jet recording device, a chassis, a gear mechanism, a sub-scanning motor, and gear mechanisms.

When recording is made on a medium using an ink jet recording device that accommodates the ink and the ink cartridge of the present disclosure, an image recorded medium on which an image is printed is obtained on demand. In addition, the ink for ink jet recording can be replenished by replacing the ink cartridges.

There is no specific limitation on the selection of the medium. For examples, plain paper, gloss paper, cloth, film, and transparent sheets can be specified as the medium. Among these, paper is particularly preferred.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Liquid Dispersion A

Using the following recipe, the polyacrylic acid ester-based polymer is dissolved in distilled water followed by addition of carbon black for premixing.

Next, the mixture is dispersed by a bead mill dispersion machine (UAM-015, manufactured by Kotobuki Industries Co., ltd.) using 0.03 mm zirconia beads (density: $6.03 \times 10^{-6}$ g/m² at a peripheral speed of 10 m/s at a liquid temperature of 30° C. for 15 minutes.

Thereafter, the resultant is subjected to centrifugal separation for coarse particles using a centrifuge (Model-3600, manufactured by Kubota Corporation) to obtain a liquid dispersion A having an average dispersion particle diameter of 156.8 nm with a standard deviation of 55.9 nm.

| Recipe | |
|---|---|
| Carbon black: NIPEX150-IQ (gas black, manufactured by Evonik Degusa Japan, Co., Ltd) | 15.0 parts |
| Polyacrylic acid ester-based polymer (Aronfloc CX-100, molecular weight: 5.5 million, manufactured by MT AquaPolymer Inc.) | 0.4 parts |
| Distilled water | 84.6 parts |

Liquid Dispersion B, C and D

Liquid dispersions B, C, and D are prepared in the same manner as in liquid dispersion A except that the polyacrylic acid ester-based polymer of the liquid dispersion A is changed to the following:

Liquid dispersion B: polyacrylic acid ester-based polymer (Aronfloc CX-200, molecular weight: 7.5 million, manufactured by MT AquaPolymer Inc.)

Liquid dispersion C: polyacrylic acid ester-based polymer (Aronfloc CX-300, molecular weight: 5.5 million, manufactured by MT AquaPolymer Inc.)

Liquid dispersion D: polyacrylic acid ester-based polymer (Aronfloc CX-400, molecular weight: 7.5 million, manufactured by MT AquaPolymer Inc.)

Liquid dispersion E

Liquid dispersion E is prepared in the same manner as in liquid dispersion B except that the amount of the polyacrylic acid ester-based polymer of the liquid dispersion B is changed to 1.9 parts and the amount of the distilled water is changed to 83.1 parts.

Liquid Dispersion F, G, and H

Liquid dispersions B, C, and D are prepared in the same manner as in liquid dispersion A except that the carbon black of the liquid dispersion B is changed to the following:

Liquid dispersion F: Pigment Yellow 138 (LIONOGEN YELLOW 1010, manufactured by Toyo Ink Co., Ltd.)

Liquid dispersion G: Pigment Red 122 (Toner mgenta E02, manufactured by Clariant)

Liquid dispersion H: Pigment Blue 15:3 (LIONOL BLUE FG-7351, manufactured by Toyo Ink Co., Ltd.)

Liquid Dispersion I

Liquid dispersion I is prepared in the same manner as in liquid dispersion A except that the amount of the polyacrylic acid ester-based polymer of the liquid dispersion A is changed to 0.075 parts and the amount of the distilled water is changed to 84.925 parts. The added amount of the polymer in the liquid dispersion is about 0.005 based on the pigment.

Liquid Dispersion J

Liquid dispersion J is prepared in the same manner as in liquid dispersion A except that the amount of the polyacrylic acid ester-based polymer of the liquid dispersion A is changed to 7.5 parts and the amount of the distilled water is changed to 77.5 parts. The added amount of the polymer in the liquid dispersion is about 0.5 based on the pigment.

Liquid Dispersions K, L, and M

Liquid dispersions K, L, and M are prepared in the same manner as in liquid dispersion A except that the polyacrylic acid ester-based polymer of the liquid dispersion A is changed to the following materials:

Liquid Dispersion K

Aanion-based surface active agent (Pionin A-45-PN, manufactured by Takemoto Oil & Fat Co., Ltd.)

Liquid Dispersion L

Polyoxyethylene alkylether phosphoric acid ester (Plysurf A219B, manufactured by DAI-ICHI KOGYO SEIYAKU CO., LTD)

Liquid Dispersion M

Anion-based surface active agent (Hitenol 18E, manufactured by DAI-ICHI KOGYO SEIYAKU CO., LTD)

Liquid Dispersions N, O, and P

Liquid dispersions N, O, and P are prepared in the same manner as in liquid dispersion F, G, and H except that the polyacrylic acid ester-based polymer of the liquid dispersions F, G, and H are changed to polyoxyethylene naphthyl ether (Pionin D-7240, manufactured by Takemoto Oil & Fat Co., Ltd.) and its amount is changed to 2.0 parts as well and the amount of the distilled water is changed to 83.0 parts.

Examples 1 to 8

Liquid dispersions A to H are used for Examples 1 to 8 as shown in Table 1 and the materials of the following ink recipe 1 are mixed and stirred for 30 minutes and filtered using a membrane filter having an opening diameter of 0.8 μm, followed by vacuum degassing to obtain ink of Examples 1 to 8.

| Ink Recipe 1 | |
|---|---|
| Liquid dispersion | 40.0 parts |
| Glycerine | 15.0 parts |
| Diethylene glycol | 15.0 parts |
| Fluorine-based surface active agent: Zonyl FS300, manufactured by Du Pont Kabushiki Kaisha, effective component: 40% | 5.0 parts |
| 2-ethyl-1,3-hexane diol | 3.0 parts |
| Anionic self-emulsification type ether-based polyurethane resin emulsion (effective composition: 35%) W5661, manufactured by Mitsui Chemicals, Inc. Acid value: 48, Weight average molecular weight: 20,000, average particle diameter: 11.0 nm | 5.0 parts |
| Polyoxyethylene (3) alkyl (C13) ether sodium acetate | 0.45 parts |
| Distilled water | 16.55 parts |

Examples 9 to 16

Examples A to H are used for Examples 9 to 16 as shown in Table 1 and the materials of the following ink recipe 2 are mixed and stirred for 30 minutes and filtered using a membrane filter having an opening diameter of 0.8 μm, followed by vacuum degassing to obtain ink of Examples 9 to 16.

| Ink Recipe 2 | |
|---|---|
| Liquid dispersion | 40.0 parts |
| Glycerine | 15.0 parts |
| Diethylene glycol | 15.0 parts |
| Fluorine-based surface active agent: Zonyl FS300, manufactured by Du Pont Kabushiki Kaisha, effective component: 40% | 5.0 parts |
| 2-ethyl-1,3-hexane diol | 3.0 parts |
| Polyoxyethylene (3) alkyl (C3) ether sodium acetate | 0.45 parts |
| Distilled water | 21.55 parts |

Examples 17 and 18

Ink of Examples 17 and 18 is obtained in the same manner as in Examples 1 to 8 except that the liquid dispersions I and J are used for Examples 17 and 18 as shown in Table 1.

Examples 19

Ink of Examples 19 is obtained in the same manner as in Example 17 except that the liquid dispersion I is used and 1.5 parts of the same polyacrylic acid ester-based polymer as in the liquid dispersion A is added.

Comparative Examples 1 to 6

Ink of Comparative Examples 1 to 6 is obtained in the same manner as in Examples 9 to 16 except that the liquid dispersions K to P are used for Comparative Examples 1 to 6 as shown in Table 1.

Images are printed on PPC paper (4024, manufactured by Xerox Corporation) by a gel jet printer (IPSiO GX5000, manufactured by Ricoh Co., Ltd.) using each ink of Examples 1 to 9 and Comparative Examples 1 to 6 and evaluated with regard to image density, sharpness of images, discharging stability, and stability as follows: The results are shown in Table 1.

Image Density
Solid images of each sample image are measured using an Xrite densitometer and evaluated using the following criteria.
Evaluation Criteria
 G (Good): 1.30 or higher
 F (Fair): 1.20 to less than 1.30
 B (Bad): less than 1.20
Sharpness of Image
Sharpness of text portions of each sample image is determined by observation by the naked eye according to the following criteria.
Evaluation Criteria
 E: Extremely good
 G: Good
 F: Fair
 B: Bad
Discharging Stability
After printing images, the printer is left for one month at 40° C. with a printer head capped and the number of cleaning operations is counted until the ink discharging state of the printer is restored to the initial discharging status and evaluated according to the following criteria.
Evaluation Criteria
 E (Excellent): restored by one operation
 G (Good): restored by two operations
 F (Fair): restored by three operations
 B (Bad): not restored by four or more operations
Preservation Stability
Each ink is put in a polyethylene container and the container is sealed. After preserving the ink at 70° C. for three weeks, the particle diameter, the surface tension, and the viscosity of the ink are measured and the ink is evaluated by the variation thereof before and after the preservation according to the following criteria.
Evaluation Criteria
 E (Excellent): Variation is less than 5% for the particle diameter, the surface tension, and the viscosity
 G (Good): Variation is less than 10% for the particle diameter, the surface tension, and the viscosity
 F (Fair): Variation is less than 30% for the particle diameter, the surface tension, and the viscosity
 B (Bad): Variation is 30% or higher for at least one of the particle diameter, the surface tension, and the viscosity

TABLE 1

| | Ink | | | | | |
|---|---|---|---|---|---|---|
| Example | Liquid dispersion | Anionic polyurethane resin (parts) | Image density | Sharpness of image | Discharging stability | Preservation stability |
| Example 1 | A | 5.0 | G | E | G | E |
| Example 2 | B | 5.0 | G | E | G | E |
| Example 3 | C | 5.0 | G | E | G | E |
| Example 4 | D | 5.0 | G | E | G | E |
| Example 5 | E | 5.0 | G | E | G | E |
| Example 6 | F | 5.0 | G | E | G | E |
| Example 7 | G | 5.0 | G | E | G | E |
| Example 8 | H | 5.0 | G | E | G | E |
| Example 9 | A | 0 | G | E | G | G |
| Example 10 | B | 0 | G | E | G | G |
| Example 11 | C | 0 | G | E | G | G |
| Example 12 | D | 0 | G | E | G | G |
| Example 13 | E | 0 | G | E | G | E |
| Example 14 | F | 0 | G | E | G | G |
| Example 15 | G | 0 | G | E | G | G |
| Example 16 | H | 0 | G | E | G | G |
| Example 17 | I | 5.0 | G | G | F | G |
| Example 18 | J | 5.0 | G | G | F | G |
| Example 19 | I | 5.0 | G | E | F | G |

TABLE 1-continued

|  | Ink | | | | | |
|---|---|---|---|---|---|---|
| Example | Liquid dispersion | Anionic polyurethane resin (parts) | Image density | Sharpness of image | Discharging stability | Preservation stability |
| Comparative Example 1 | K | 0 | F | B | F | F |
| Comparative Example 2 | L | 0 | B | B | B | B |
| Comparative Example 3 | M | 0 | B | B | B | B |
| Comparative Example 4 | N | 0 | B | B | B | B |
| Comparative Example 5 | O | 0 | B | B | B | B |
| Comparative Example 6 | P | 0 | B | B | B | B |

As seen in the results shown in Table 1, with the ink for ink jet recording of the present disclosure, high density images are obtained with excellent image sharpness, discharging stability, and preservation stability. The same applies to the ink cartridge using the ink, the ink jet recording method and the ink jet recording device, the image forming method, and the image recorded medium that use the ink.

Having now fully described the invention, it will be apparent to one of ordinary skill in the art that many changes and modifications can be made thereto without departing from the spirit and scope of the invention as set forth therein.

What is claimed is:

1. Ink for inkjet recording, comprising:
    a coloring agent;
    water;
    an aqueous organic solvent; and
    a polyacrylic acid ester-based polymer represented by the following chemical structure 1:

Chemical structure 1

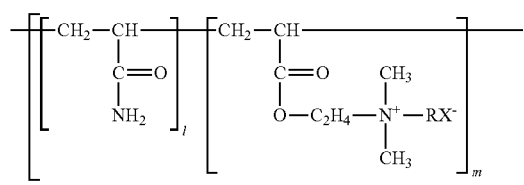

-continued

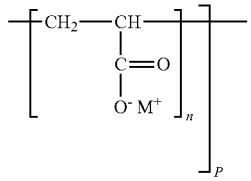

where R epresents a hydrogen atom and a methyl group, X— represents F—, Cl—, and Br—, M+ represents Na+, K+, NH4+, and Li+ and symbols l, m, n, and p independently represent integers of from 10 to 3,000.

2. The ink for inkjet recording according to claim 1, further comprising an anionic self-emulsification type ether-based polyurethane resin emulsion.

3. An ink cartridge comprising:
    a container to house the ink for ink jet recording of claim 1.

4. An inkjet recording device comprising:
    the ink cartridge of claim 3.

5. An image forming method comprising:
    printing images on a medium using the ink for ink jet recording of claim 1.

6. An image recorded medium formed by the image forming method of claim 5.

* * * * *